Figure 1:
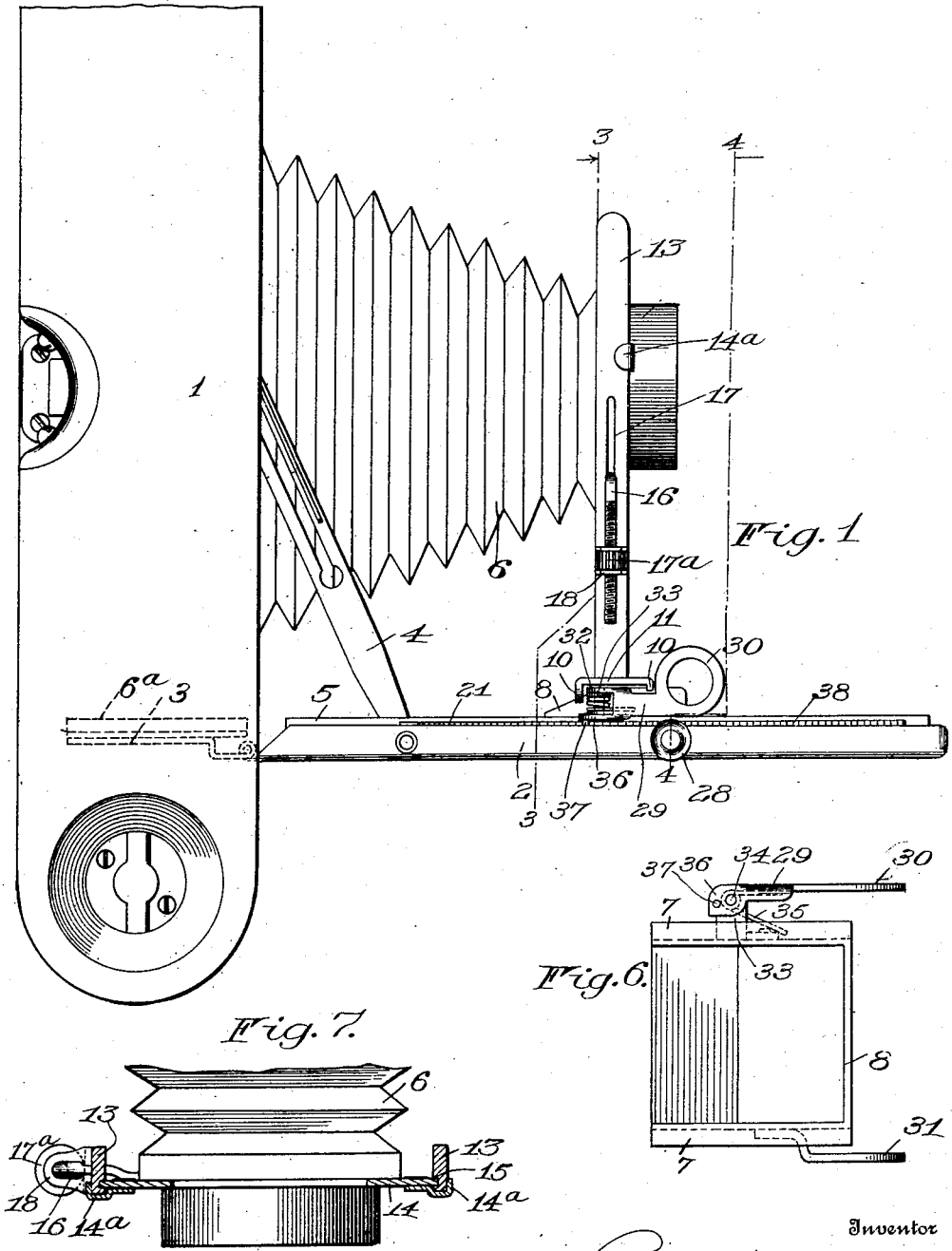

R. KROEDEL.
FOCUSING DEVICE FOR CAMERAS.
APPLICATION FILED APR. 24, 1907.
917,079.
Patented Apr. 6, 1909.
3 SHEETS—SHEET 2.
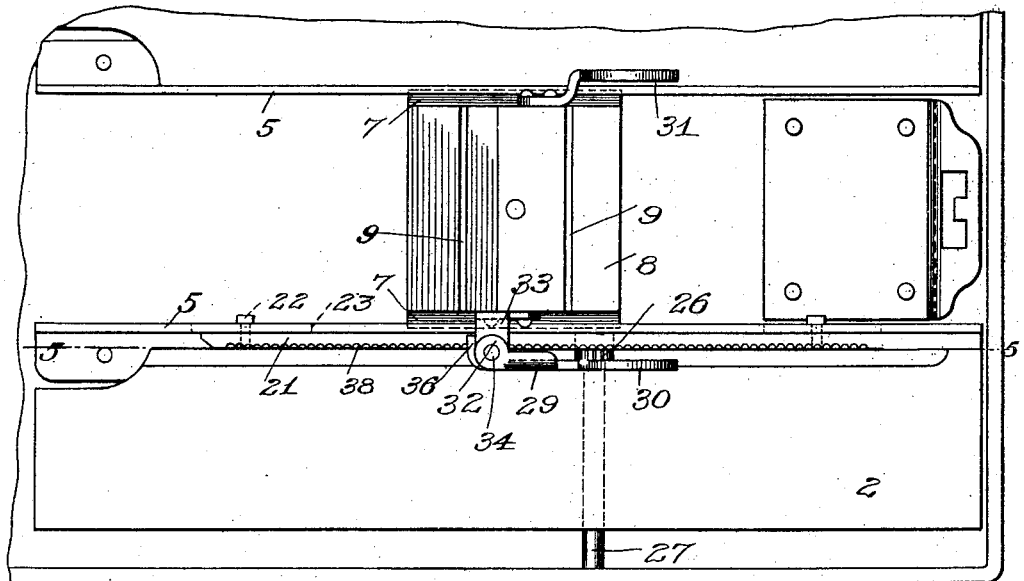
Fig. 2.
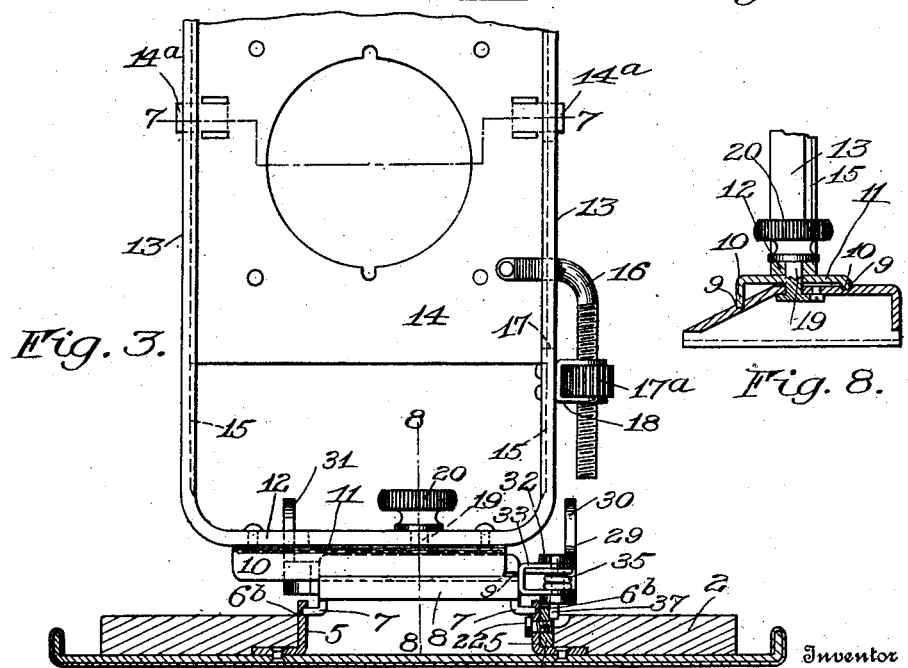
Fig. 3.
Fig. 8.
Witnesses
Walter B. Payne
Russell B. Griffitts
Inventor
Robert Kroedel
By Church & Rich
his Attorneys

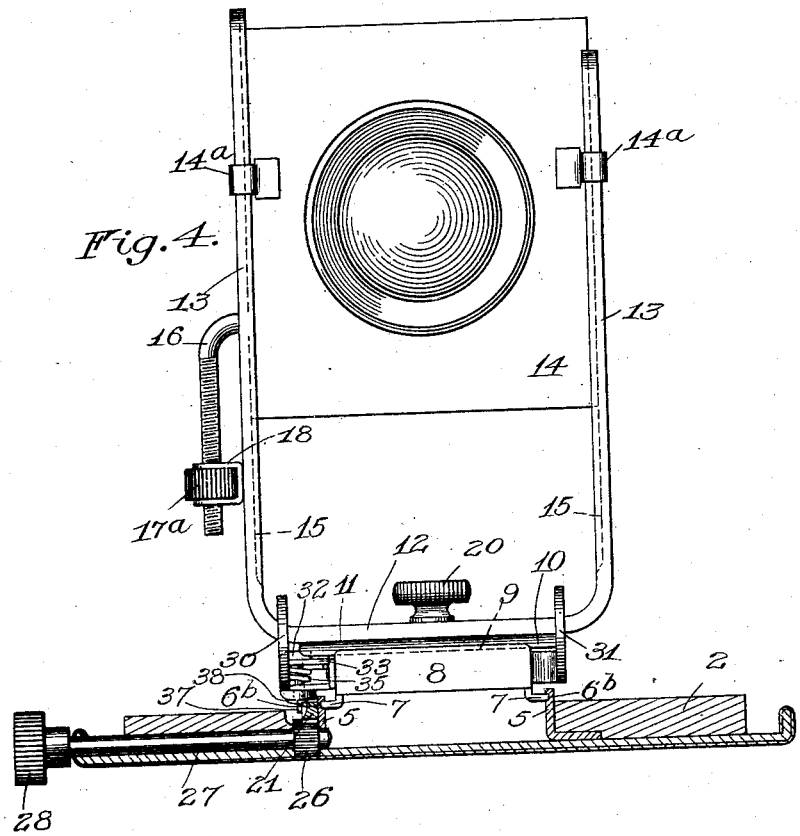
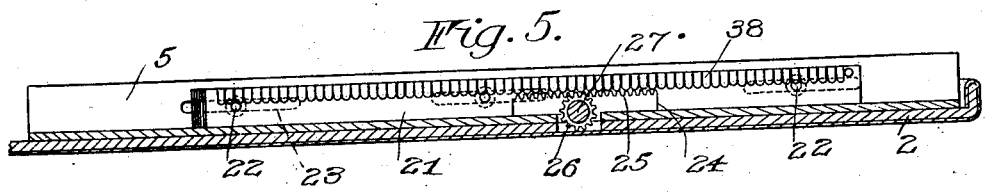

UNITED STATES PATENT OFFICE.

ROBERT KROEDEL, OF ROCHESTER, NEW YORK, ASSIGNOR TO EASTMAN KODAK COMPANY, OF ROCHESTER, NEW YORK, A CORPORATION OF NEW YORK.

FOCUSING DEVICE FOR CAMERAS.

No. 917,079.  Specification of Letters Patent.  Patented April 6, 1909.

Application filed April 24, 1907. Serial No. 369,910.

*To all whom it may concern:*

Be it known that I, ROBERT KROEDEL, of Rochester, in the county of Monroe and State of New York, have invented certain new and useful Improvements in Focusing Devices for Cameras; and I do hereby declare the following to be a full, clear, and exact description of the same, reference being had to the accompanying drawings, forming a part of this specification, and to the reference-numerals marked thereon.

My present invention relates to photographic cameras of the type embodying an extensible connection between the lens and the support for the sensitized material or screen whereby the two may be moved relatively into the focus for different objects at varying distances from the lens, and it has for its object to provide a simple and efficient device capable of convenient and rapid operation by means of which such focal adjustments may be attained with ease and precision.

A further object of my invention is to also provide means for accurately controlling the adjustments of the lens in the plane thereof.

To these and other ends the invention consists in certain improvements and combinations of parts all as will be hereinafter more fully described, the novel features being pointed out in the claims at the end of the specification.

In the drawings: Figure 1 is a side elevation of a folding camera embodying my invention, the bed and lens carriage being extended. Fig. 2 is a top plan view of a portion of the bed showing the lens carriage with the lens supporting members removed. Fig. 3 is a rear elevation of the lens support and carriage taken in transverse vertical section through the bed on line 3—3 of Fig. 1. Fig. 4 is a front elevation of the same parts in transverse vertical section through the bed on line 4—4 of Fig. 1. Fig. 5 is a detail view being a longitudinal vertical section through the bed on the line 5—5 of Fig. 2 and showing the track and rack bar in side elevation. Fig. 6 is a bottom view of the lens carriage and the clutch devices carried thereby in detail. Fig. 7 is a horizontal transverse section through the lens support taken on the line 7—7 of Fig. 3; and, Fig. 8 is a cross section of the lens carriage on the line 8—8 of Fig. 3.

Similar reference numerals in the several figures indicate similar parts.

The purpose of a focusing device when applied to cameras being primarily to bring the surface upon which the image is reflected, into focus with the lens, I shall refer to such surface throughout this specification as the screen or focusing screen of the camera which will apply equally whether the surface be that of the sensitized material positioned by reference to indications on a scale established by preliminary tests or that of a ground glass plate afterward replaced by the sensitized material, upon which the correct reflection is determined by inspection.

Referring to the drawings, 1 indicates the box or body of a folding camera having a drop front 2 which constitutes a bed, when projected, extending in substantial continuation of the bottom 3 of the body (shown in dotted lines in Fig. 1), said front being supported by the pivoted arms 4, as is usual. The lens board or support, 14, is movably connected to the body, which latter contains the focusing screen, by the bellows 6, and when the camera is folded, the bellows is collapsed and the lens occupies a position within the body adjacent the screen, all of which is as usual. Rigidly secured to the bed 2 is a track or way composed in the present instance of upwardly-projecting guides 5, while similar guides $6^a$ are provided on the bottom of the body to form substantially a continuation of those on the bed when the latter is in extended position. On their inner or adjacent sides, said guides are provided with grooves $6^b$ within which operate the tongues 7 of a carriage 8, preferably formed of sheet metal and of any convenient general form. The carriage is in turn provided with parallel transverse grooves 9 (Fig. 2) with which coöperate the downwardly-extending flanges 10 of a sliding plate 11. Secured to the plate is a yoke 12 between the upwardly-extending arms 13 of which is supported the lens mount or board 14, provided with projections $14^a$ engaging on the outer sides of the arms of the yoke 12 to prevent spreading of the latter. This board slides vertically in grooves 15 in the arms and has attached thereto a threaded arm or projection 16 extending laterally through a slot 17 in one of the arms and downwardly-parallel with the latter, into coöperation with a threaded nut or member 17a supported in a bracket 18 on the arm. The yoke 12 and plate 11 are provided with a slot through which projects a threaded bolt 19 secured to the carriage and having a thumb nut 20 on its projecting end. It will be seen from the construction thus far described that the vertical adjustment of the lens may be obtained with nicety by rotation of the member 17a in the proper direction, while lateral adjustments are effected by sliding the supporting yoke or plate in the grooves of the carriage, upon which latter the said supports may be secured at any desired position of adjustment by tightening the thumb nut 20.

Movable longitudinally of the bed and extending parallel with the guides 3 is a slide 21 which in the present instance is mounted on the latter and supported by headed pins 22 which coöperate with corresponding slots 23 in one of the guides. An intermediate portion 24 of the slide is cut away on its lower side, the indented portion being provided with teeth 25 forming in effect a rack bar with which coöperates a pinion 26 mounted on the bed and by means of which the slide is operated relatively to the guide in either direction, the engagement of the pins 22 with the ends of the slots 23 determining the limit of movement. The pinion 26, in the present instance, is secured rigidly to an arbor 27 journaled in the bed as shown and having its inner end journaled in the guide, the outer end being provided with a thumb nut 28 by means of which the operator is enabled to conveniently rotate the pinion. The thumb nut preferably projects beyond the lateral edge of the bed, a suitable indentation or depression being formed at the corresponding points in the edge of the camera body so that it will lie below the surface of the camera as a whole when the latter is folded.

The carriage is provided on the side corresponding to that on which the slide is located, with the lever 29 having a forwardly-projecting operating arm 30 corresponding to a stationary finger piece 31 upon the opposite side of the carriage, which members are adapted to be grasped between the thumb and fore-finger of the operator, and pressed inwardly to cause the movement of the lever. The latter is pivotally supported by means of horizontally-projecting lugs 32 coöperating with the arms of a bracket 33 on the carriage by means of a pivot pin 34. Encircling the pin 34 is a spring 35, one end of which bears against the operating arm of the lever, and the other against the side of the carriage by means of which the short inner end of the lever 36 formed by a continuation of the lug 32 is given a normal tendency to move inward. The lower one of the lugs 32 is provided with a downwardly-projecting pin 37, which by this action is caused to automatically engage the slide 21 when the carriage is drawn out, the slide being preferably provided on its lateral face with a series of serrations 38 forming projections with which the pin coöperates to hold the carriage securely in any adjusted position. The lower lug 32 is of such dimensions as will permit it to engage directly with the guide when the carriage is moved beyond the end of the slide, as for instance, when occupying a position upon the portion of the track located within the camera body when the latter is in folded position, whereby the carriage is held securely against movement.

The operation of the device will require but brief description. Assuming the carriage to be in the position last mentioned, and it is desired to focus the camera on a given object, the front or bed is let down and inward pressure exerted upon the arm 30 and the lever 29 by grasping the said arm and the finger piece 31 between the thumb and fore finger as before mentioned, which releases the clamping engagement of the lug 32 with the rear portion of the track and allows the carriage to be withdrawn to the position which in the judgment of the operator, is in approximate focus, or he may be aided by a scale and indicator arranged upon the bed and track. In this position, releasing the arm 30 allows the spring 35 to move it and causes the pin 37 to engage with the serrations of the slide and lock the latter to the carriage. The final adjustment may then be obtained through the accurate control afforded by the operation of the thumb nut 28 which rotates the pinion 26 coöperating with the rack 25, causing the advancement or retraction of the slide as desired.

In cameras of the type indicated, the screen may be positioned with relation to the lens to lie in the plane of the image reflected thereby through the movement of either the screen or the lens, the other member usually remaining at a fixed point on the optical axis. It will therefore be understood, both methods being known in the art, that while I have illustrated my improvements connected in a manner to impart movement to the lens, the screen being fixed, they may, if desired, be applied with equal advantage to a camera in which these parts are, in this respect, reversed by a slight modification and without departing from the spirit of the invention.

I claim as my invention:

1. In a camera, the combination with a bed having a way thereon, of a slide movable relatively to the bed, a carriage directly mounted on the way and movable relatively thereto, means arranged independently of the carriage for operating the slide and means for causing movement of the carriage by movement of the slide.

2. In a camera, the combination with a bed having a way thereon, of a slide movable relatively to the bed, a carriage directly mounted on the way and movable relatively thereto, means for operating the slide and means for interlocking the slide and carriage.

3. In a camera, the combination with a bed, having a way comprising parallel guides, of a carriage directly mounted on said way and movable relatively thereto between the guides, a slide arranged on the outer side of one of said guides and movable relatively to the bed, means for operating the slide and means for effecting movement of the carriage by the movement of the slide.

4. In a camera, the combination with a bed having a way comprising parallel guides, of a carriage directly mounted on said way and movable relatively thereto between the guides, a slide arranged on the outer side of one of said guides and movable relatively to the bed, means for operating the slide and means for interlocking the slide and carriage.

5. In a camera, the combination with a bed having a way thereon, of a slide movable relatively to the bed, a carriage directly mounted on the way and movable relatively thereto, means for securing the carriage to the slide at different points thereon and means for operating the slide.

6. In a camera, the combination with a bed and a way thereon embodying upwardly-projecting parallel guides, of a carriage directly mounted on said way and movable relatively thereto between the guides, a slide mounted on one of the guides and movable relatively to the bed, means for causing movement of the carriage through movement of the slide and means for operating the latter.

7. In a camera, the combination with a bed and a way thereon, of a carriage directly mounted on said way and movable relatively thereto, a slide mounted on the way and movable relatively to the bed, means for effecting movement of the carriage by movement of the slide and means for operating the latter.

8. In a camera, the combination with a bed and a way thereon embodying upwardly-projecting parallel guides, one of said guides having longitudinal slots therein, of a carriage mounted on the way and movable relatively thereto, a slide movably mounted on one of the guides and having pins operating in the slots therein, means for causing movement of the carriage through movement of the slide and means for operating the latter.

9. In a camera, the combination with a bed and a way thereon embodying parallel guides, of a carriage directly mounted on the way and movable relatively thereto between the guides, a sliding rack bar arranged parallel to said guides, means for operating the carriage by movement of the rack bar and a pinion journaled on the bed and coöperating with the rack bar.

10. In a camera, the combination with a bed and a way thereon embodying parallel guides, of a carriage directly mounted on the way and movable relatively thereto between the guides, a slide arranged parallel to the guides and having an indented portion provided with teeth, means for operating the carriage by movement of the slide, and a pinion coöperating with the teeth on the latter and journaled in the bed.

11. In a camera, the combination with a bed having a way thereon embodying parallel upwardly-projecting guides, of a carriage mounted on the way and movable relatively thereto between the guides, and a spring-actuated lever on the carriage normally engaging the track to lock the carriage thereon.

12. In a camera, the combination with a bed and a way thereon embodying upwardly-projecting parallel guides having grooves on their inner faces, of a carriage movable relatively to said way and having tongues coöperating with the grooves in the guides and a spring-actuated lever on the carriage having a clamping arm normally engaging the way to lock the carriage thereon.

13. In a camera, the combination with a bed and a way thereon embodying upwardly-projecting guides having grooves therein, of a carriage mounted on the way to move relatively thereto and having tongues coöperating with the grooves in the guides, a sliding track bar extending longitudinally of the way a pinion coöperating with said rack bar and a clamping lever on the carriage engaging the rack bar to lock the carriage thereon.

ROBERT KROEDEL.

Witnesses:
RUSSELL B. GRIFFITH,
C. KETCHUM.